Nov. 27, 1928.
B. McGILLAN
DUSTPAN
Filed April 7, 1928
1,693,489
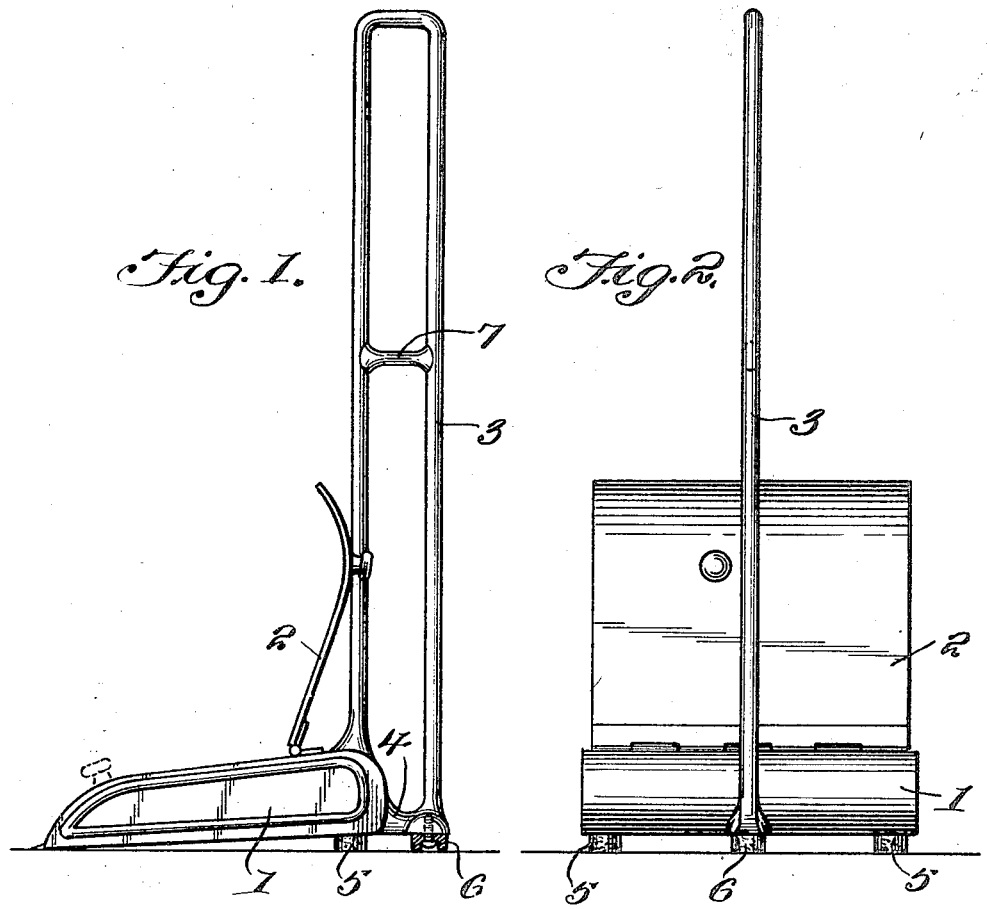
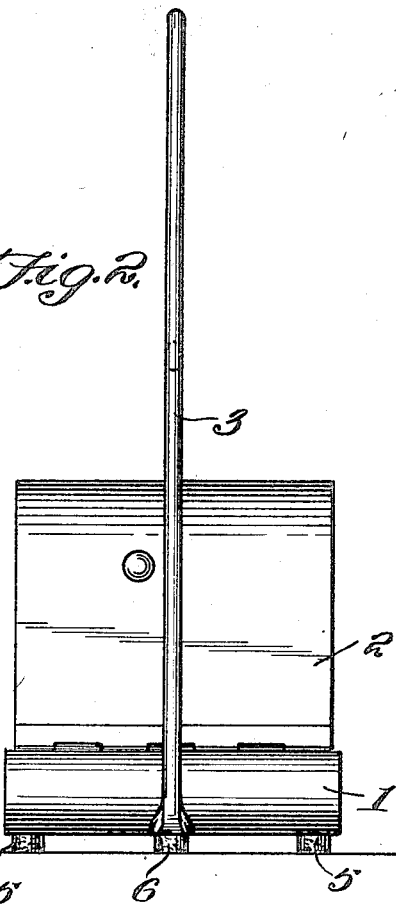
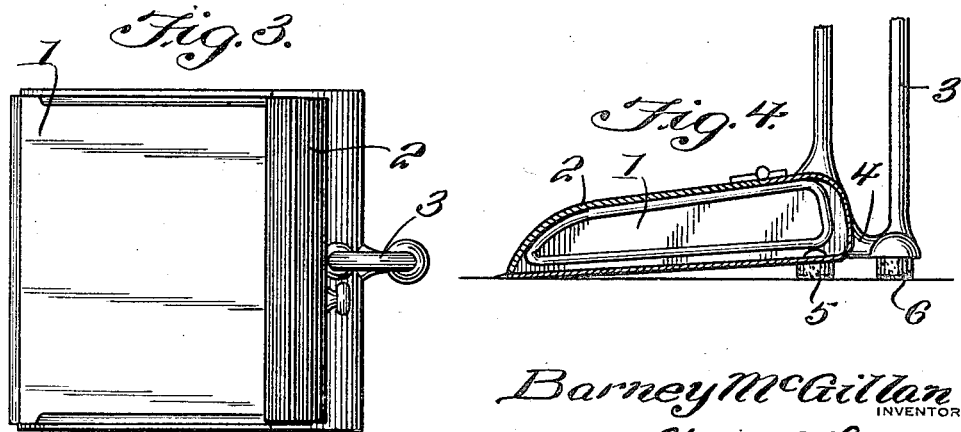
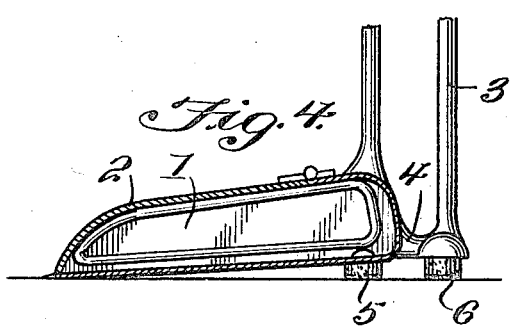
Barney McGillan
INVENTOR
BY Victor J. Evans
ATTORNEY
WITNESS: J.T.L. Wright Patented Nov. 27, 1928.

1,693,489

UNITED STATES PATENT OFFICE.

BARNEY McGILLAN, OF GREEN BAY, WISCONSIN.

DUSTPAN.

Application filed April 7, 1928. Serial No. 268,182.

This invention relates to a dust pan, the general object of the invention being to provide means whereby the pan can be used without the user bending over to place the pan upon the floor or remove it from the floor, by providing the pan with a long upright handle, the handle also acting to prevent the pan from being knocked over.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the device, with the cover in raised position.

Figure 2 is a rear view of Figure 1.

Figure 3 is a plan view.

Figure 4 is a sectional view through the lower part of the device.

In these views, the numeral 1 indicates the dust pan which is of the usual shape and 2 indicates a hinged cover therefor, the cover extending over a portion of the top of the pan and over the front end thereof. A vertically arranged U-shaped rod 3 is fastened to the rear of the pan at the center thereof by having its front limb fastened to the top of the pan and its rear limb fastened to the rear part of the pan by the projection 4.

A pair of feet forming members 5 is attached to the rear part of the bottom of the pan, one adjacent each side of the pan and a similar member 6 is attached to the lower end of the outer limb of the rod. These members 5 and 6 are preferably formed of rubber.

A brace 7 connects the two limbs of the U-shaped rod together, intermediate their ends.

From the foregoing it will be seen that the U-shaped rod forms an upright handle which enables the pan to be moved about without the user stooping over. The weight of the handle also acts to prevent the pan being tipped over while it is being handled or while dirt or the like is being swept from the floor into the pan.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A dust pan having an upright handle connected with the rear part thereof, said handle being of U-shape with the end of one limb connected with the top part of the pan at the rear thereof, a projection at the rear of the pan connected with the end of the other limb, feet forming members connected with the bottom of the pan at the rear thereof and a foot forming member connected with the lower end of that limb of the handle which is connected with the projection.

2. A dust pan having an upright handle connected with the rear part thereof, said handle being of U-shape with the end of one limb connected with the top part of the pan at the rear thereof, a projection at the rear of the pan connected with the end of the other limb, feet forming members connected with the bottom of the pan at the rear thereof, a foot forming member connected with the lower end of that limb of the handle which is connected with the projection and a hinged cover connected with the pan for covering the top and front of the pan.

In testimony whereof I affix my signature.

BARNEY McGILLAN.